(12) United States Patent  
McCulloch et al.

(10) Patent No.: US 8,096,617 B2
(45) Date of Patent: Jan. 17, 2012

(54) SEAT HAVING TILTABLE SEAT CUSHION

(75) Inventors: Peter Robert McCulloch, Grosse Pointe Woods, MI (US); Mark A. Farquhar, Ortonville, MI (US)

(73) Assignee: Lear Corporation, Southfield, MI (US)

( * ) Notice: Subject to any disclaimer, the term of this patent is extended or adjusted under 35 U.S.C. 154(b) by 117 days.

(21) Appl. No.: 12/688,866

(22) Filed: Jan. 16, 2010

(65) Prior Publication Data

US 2010/0314927 A1 Dec. 16, 2010

Related U.S. Application Data

(60) Provisional application No. 61/187,447, filed on Jun. 16, 2009.

(51) Int. Cl.
*B60N 2/12* (2006.01)
*B60N 2/16* (2006.01)
*B60N 2/18* (2006.01)

(52) U.S. Cl. .................................. 297/344.15
(58) Field of Classification Search ............... 297/344.15
See application file for complete search history.

(56) References Cited

U.S. PATENT DOCUMENTS

| 4,739,959 | A | | 4/1988 | Meiller | |
|---|---|---|---|---|---|
| 4,993,678 | A | * | 2/1991 | Easter | 297/344.15 X |
| 5,080,434 | A | | 1/1992 | Locher | |
| 5,236,246 | A | | 8/1993 | Harrell | |
| 6,425,557 | B1 | * | 7/2002 | Becker et al. | 297/344.15 X |
| 6,505,888 | B1 | * | 1/2003 | Teufel et al. | 297/344.15 |
| 6,533,351 | B2 | * | 3/2003 | Deptolla | 297/344.15 X |
| 6,902,234 | B2 | * | 6/2005 | Becker et al. | 297/344.15 X |
| 7,077,471 | B2 | * | 7/2006 | Schumann et al. | 297/344.15 X |
| 7,172,251 | B2 | * | 2/2007 | Takata et al. | 297/344.15 |
| 7,517,020 | B2 | * | 4/2009 | Yokota | 297/344.15 |
| 7,654,615 | B2 | * | 2/2010 | Ventura et al. | 297/344.15 |
| 7,963,605 | B2 | * | 6/2011 | Ramaseshadri et al. | 297/344.15 |
| 2006/0061176 | A1 | * | 3/2006 | Sakai et al. | 297/344.15 |
| 2008/0007104 | A1 | * | 1/2008 | Yokota | 297/344.15 |
| 2009/0058158 | A1 | * | 3/2009 | Sobieski | 297/344.15 X |

* cited by examiner

*Primary Examiner* — Rodney B White
(74) *Attorney, Agent, or Firm* — MacMillan, Sobanski & Todd, LLC

(57) ABSTRACT

A seat is disclosed herein. The seat includes a seat cushion frame assembly. The seat also includes a seat cushion mounted on the seat cushion frame assembly for pivoting movement about a cushion pivoting axis. The seat also includes a cushion lock operably disposed to selectively lock the seat cushion frame assembly and the seat cushion relative to one another and thereby prevent the pivoting movement. The cushion lock defines a plurality of locked positions such that the seat cushion is positionable in a plurality of different orientations relative to the seat cushion frame assembly.

18 Claims, 11 Drawing Sheets

SEAT HAVING TILTABLE SEAT CUSHION

BACKGROUND OF THE INVENTION

1. Field of the Invention

The invention relates to a seat having a tiltable seat cushion.

2. Description of Related Prior Art

U.S. Pat. No. 5,236,246 discloses an adjustable headrest having an integral pivot connection. The tilt-adjustable headrest assembly of the '246 patent has a headrest body and a mounting post. The headrest body has snap-together first and section sections formed with integral saddle portions which directly pivotally engage the mounting for pivotally mounting the headrest body to the mounting post.

SUMMARY OF THE INVENTION

In summary, the invention is a seat. The seat includes a seat cushion frame assembly. The seat also includes a seat cushion mounted on the seat cushion frame assembly for pivoting movement about a cushion pivoting axis. The seat also includes a cushion lock operably disposed to selectively lock the seat cushion frame assembly and the seat cushion relative to one another and thereby prevent the pivoting movement. The cushion lock defines a plurality of locked positions such that the seat cushion is positionable in a plurality of different orientations relative to the seat cushion frame assembly.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENT

Figure 1:
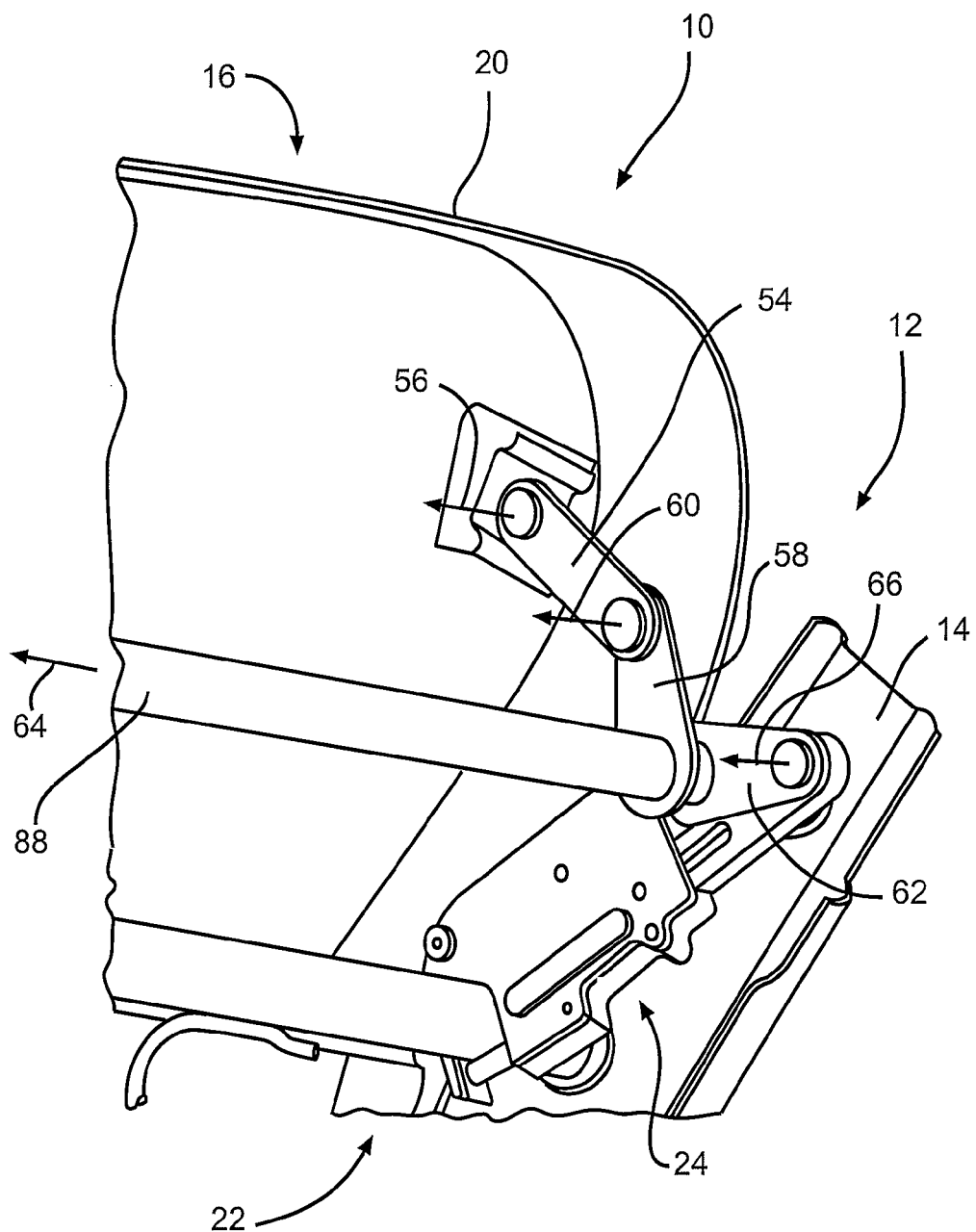
FIG. 1 is a perspective view of a first embodiment of the invention looking into the upper front corner of seat frame wherein the cloth and padding of the seat have been omitted.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Referring now to FIG. 1, a seat 10 includes a seat cushion frame assembly 12 having first and second plate members fixed together in spaced relationship. FIG. 1 shows a first plate member 14 and a second plate member (not shown) can be a minor image of the first plate member 14. The seat 10 also includes a seat cushion 16 mounted on the seat cushion frame assembly 12 for pivoting movement about a cushion pivoting axis 18 (shown in FIG. 4). The second plate member (not shown) is positioned on the opposite side of the seat cushion 16 relative to the first plate member 14. The exemplary seat cushion 16 can include a metal pan 20. Foam and cloth or leather can cover the pan 20 in the vehicle, but only the pan 20 is shown in the Figures to allow other structures to be seen more clearly.

The seat 10 also includes a cushion lock 22 operably disposed to selectively lock the seat cushion frame assembly 12 and the seat cushion 16 relative to one another and thereby prevent the pivoting movement. The cushion lock 22 defines a plurality of locked positions such that the seat cushion 16 is positionable in a plurality of different orientations relative to the seat cushion frame assembly 12.

Figure 2:
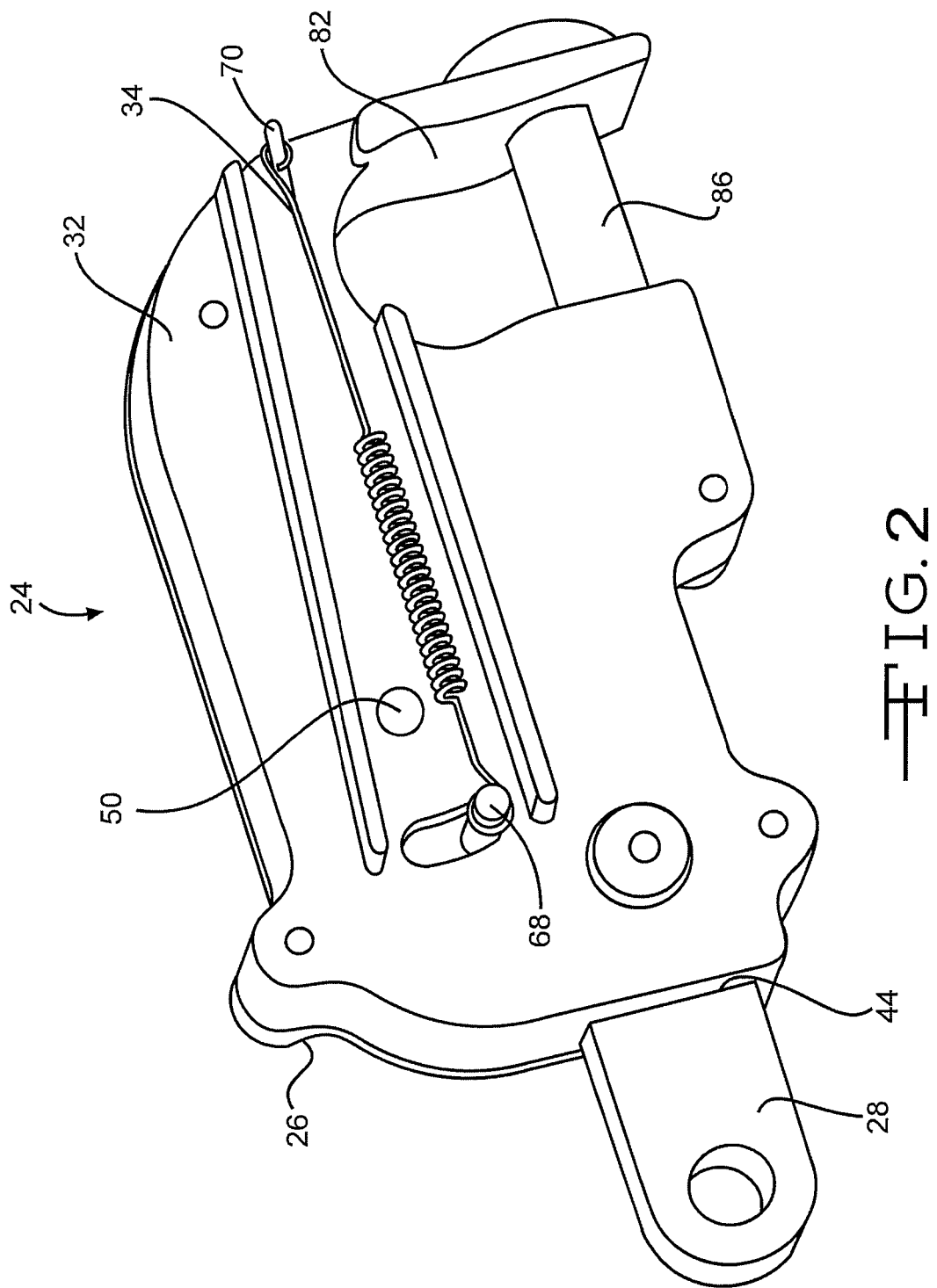
FIG. 2 is a perspective view of an exemplary ratchet assembly applied in FIG. 1.
Figure 3:
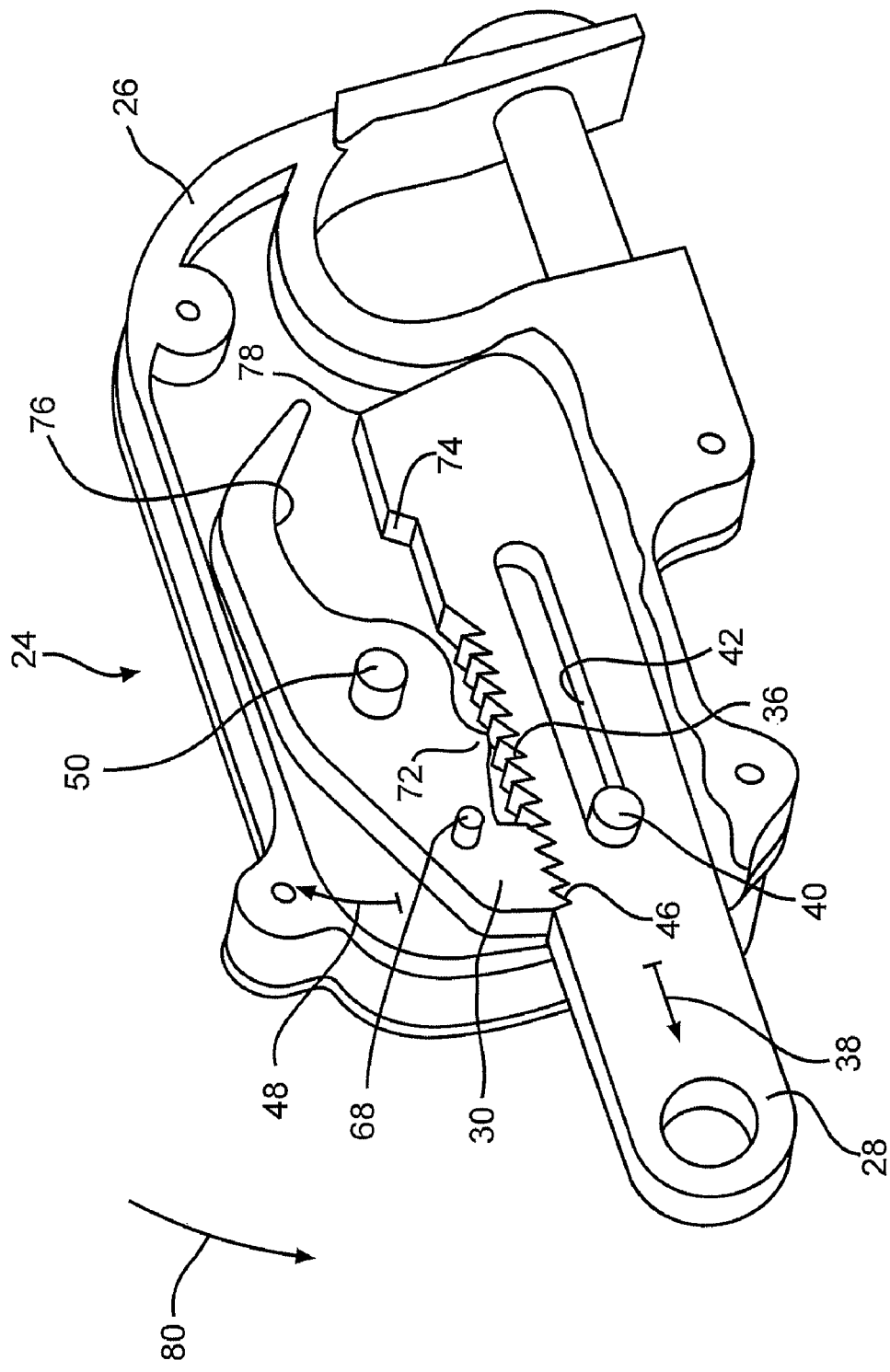
FIG. 3 is a perspective view of the exemplary ratchet assembly shown in FIG. 2 wherein a portion of the outer housing is broken away to show the internal components.

The first exemplary cushion lock 22 can include a ratchet assembly. FIG. 1 shows a ratchet assembly 24. FIGS. 2 and 3 show two views of the exemplary ratchet assembly 24. FIG. 2 is a perspective view and FIG. 3 is a perspective view wherein the outer housing is in phantom to show the internal components. The first exemplary cushion lock 22 can include a torsion bar 88. The seat cushion 16 and torsion bar 88 are engaged such that the torsion bar 88 rotates when the seat cushion is being pivoted. The ratchet assembly 24 can lock the torsion bar 88 and prevent the torsion bar 88 from rotating, thus locking the seat cushion 16 as well. The ratchet assembly 24 can be positioned on the inside of the seat or the outside of the seat.

Referring now to both FIGS. 2 and 3, the exemplary ratchet assembly 24 can include a base member 26, a first locking member 28, a second locking member 30, a cover 32, and a spring 34. The first locking member 28 can define a first set of teeth 36 and be mounted on and guided by the base member 26 in sliding movement. The sliding movement can occur along an axis referenced in FIG. 3 at axis 38. In the exemplary embodiment, a first end limit of travel for the first locking member 28 is shown in FIGS. 2 and 3. The first locking member 28 can move in the direction of the arrow on the axis 38 to project further out of the housing defined by the base member 26 and cover 32. This will be described in greater detail below. Movement of the first locking member 28 can be guided by the cooperation between a pin 40 projecting from the base member 26 and slot 42 formed in the first locking member 28. Movement of the first locking member 28 can also be guided by an opening 44 defined in the housing defined by the base member 26 and cover 32.

The second locking member 30 can define a second set of teeth 46 and be mounted on and guided by the base member 26 for pivoting movement. The pivoting movement is referenced at arrow 48 and occurs about a pin 50. The pin 50 can be part of the base member 26. The pin 50 can also be integral with the second locking member 30. A first end limit of travel for the second locking member 30 is shown in FIG. 3.

Figure 4:
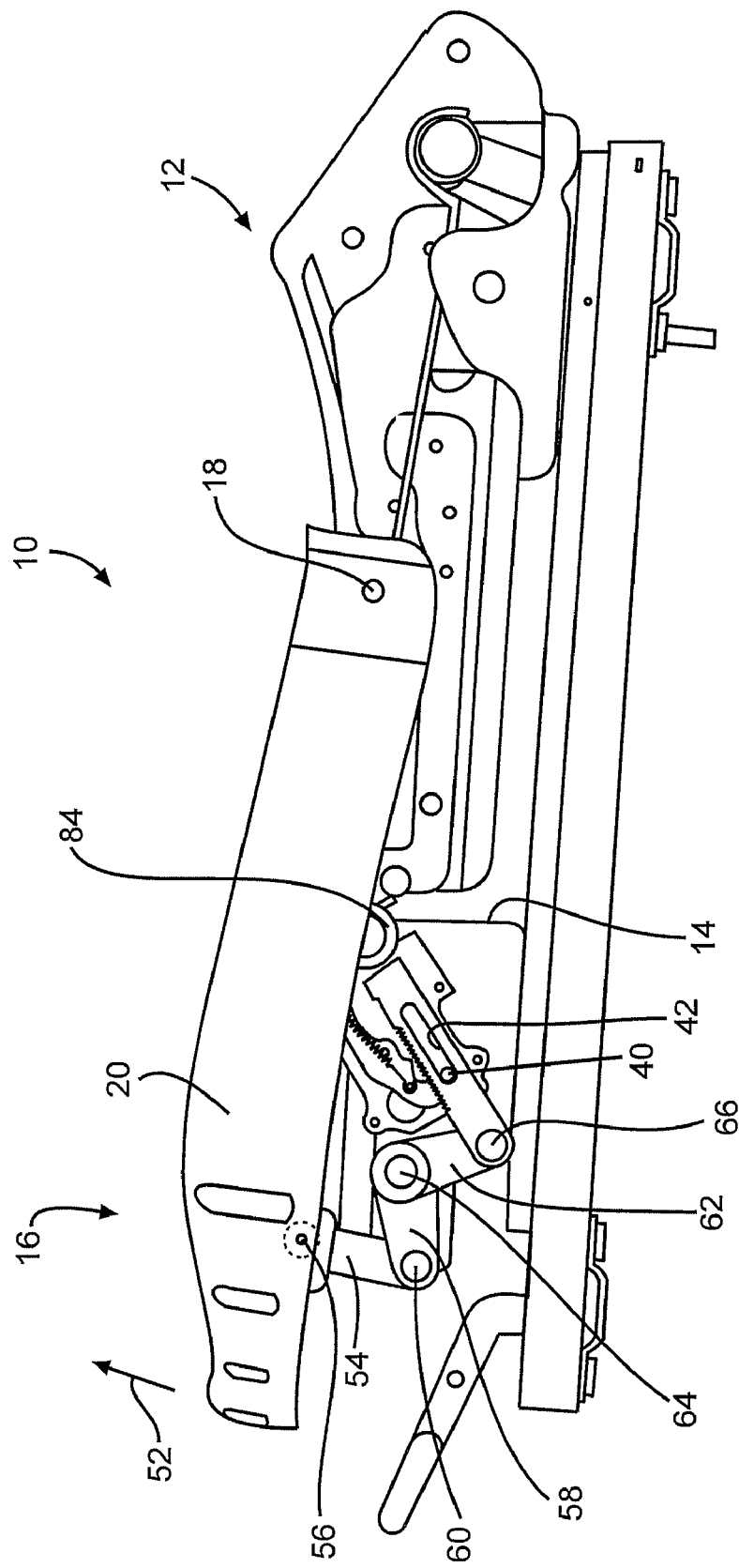
FIG. 4 is a side view of the first embodiment shown in FIG. 1 wherein a seat cushion pan is in a lowest sitting position.

FIG. 3 shows the second locking member 30 in a first position wherein the first and second sets of teeth 36 and 46 are meshed together. The arrangement of the structures in FIG. 3 is also shown in FIG. 4. The seat cushion 16 can be in the lowest orientation relative to the seat frame assembly 12. A user of the seat desiring to raise the seat cushion 16 about the cushion pivot axis 18 can pull the seat cushion 16 upward, in the direction referenced by arrow 52. When this occurs, the motion of the seat cushion 16 can be translated to the ratchet assembly 24. As best seen in FIG. 1, a link 54 can be connected to the seat cushion 16 for pivoting movement about an axis 56. The link 54 can also be connected to a link 58 for pivoting movement about an axis 60. The link 58 can also be fixedly associated with a link 62. The links 58 and 62 can concurrently pivot about an axis 64. The link 62 can also be connected to the first locking member 28 for pivoting movement about an axis 60. It is noted that links similar to links 54, 58 and 62 can be positioned on an opposite side of the seat cushion 16.

The ratchet assembly 24 can be for pivoting movement on the plate member 14. The base member 26 and cover 32 can define an open slot 82 shown in FIG. 2 to receive a cross-member 84 of the seat cushion frame assembly 12 shown in FIG. 4. The slot 82 can be closed by a structure supplemental the base member 26 and/or cover 32, such as a threaded bolt 86.

Figure 5:
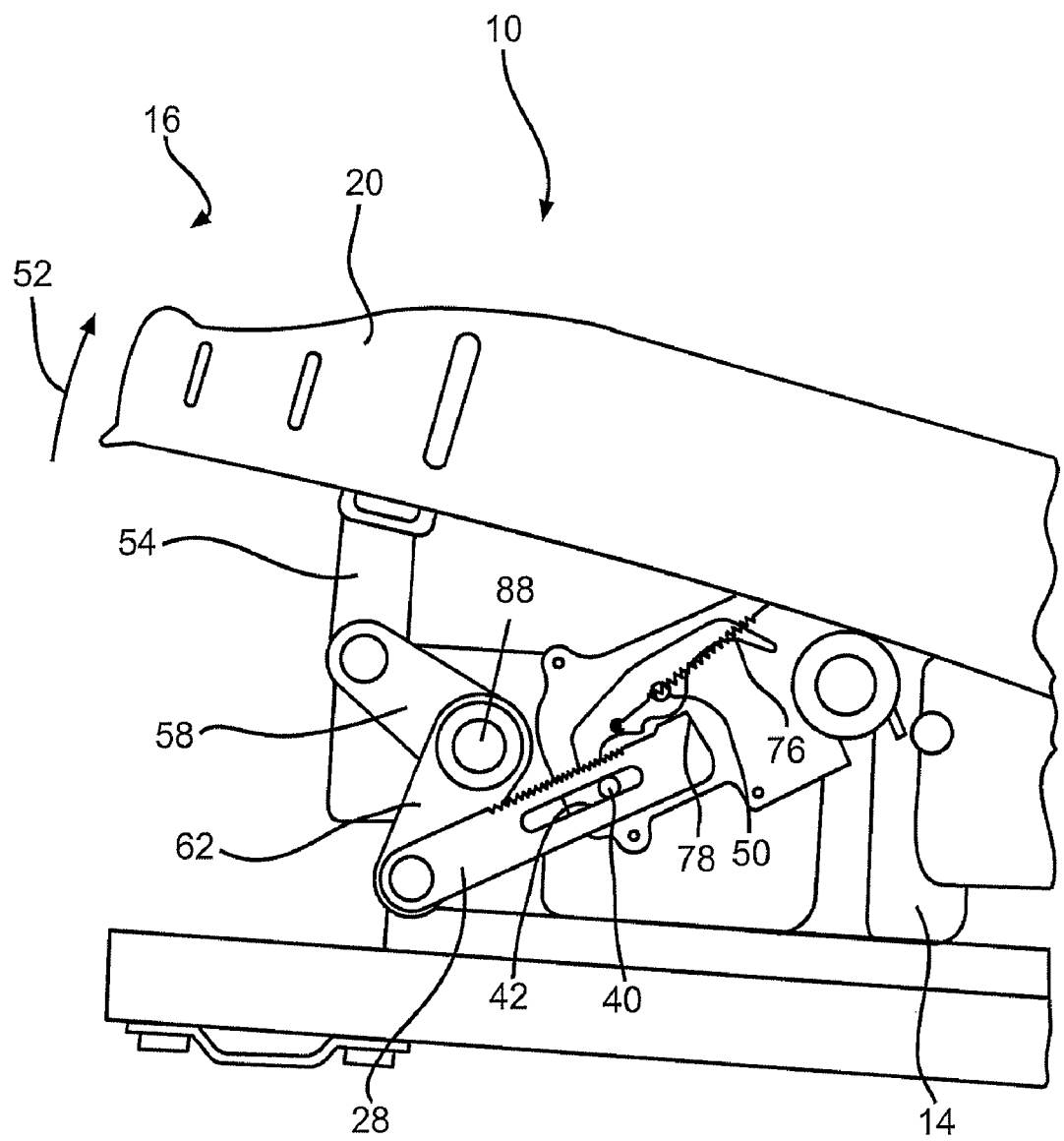
FIG. 5 is a side view similar to FIG. 4 but wherein the seat cushion pan has been raised to a highest sitting position.
Figure 6:
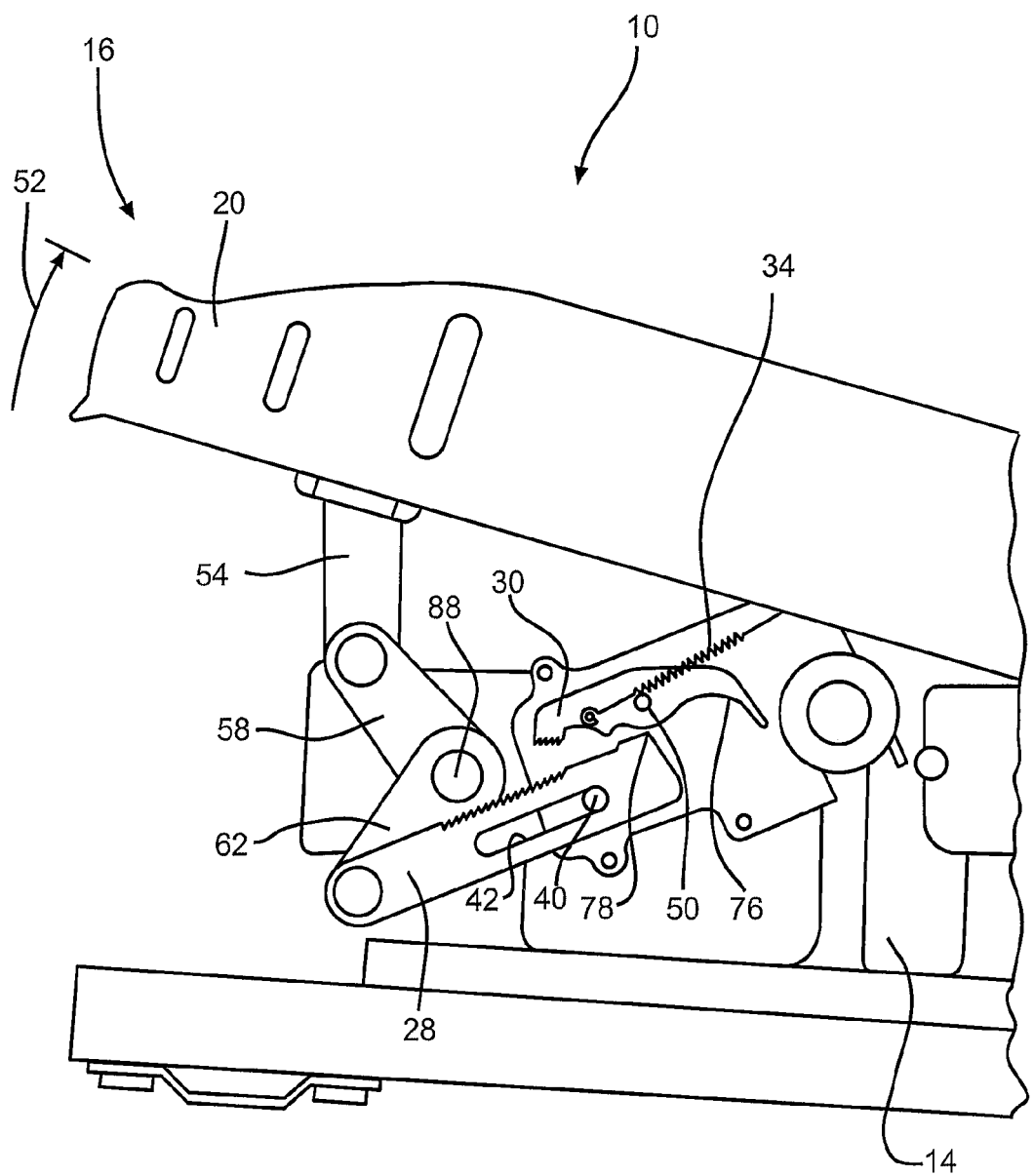
FIG. 6 is a side view similar to FIG. 4 but wherein the seat cushion pan has been raised past the highest sitting position shown in FIG. 5 in order to release the exemplary ratchet assembly.

The sequence of movement of the exemplary seat cushion 16 from the lowest orientation relative to the seat frame assembly 12 to a high end limit of travel is shown in FIGS. 4-7. As set forth above, FIG. 4 shows the lowest orientation. When the user applies a force to move the seat cushion 16 upwardly, the links 54, 58, 62 cooperate to translate motion of the seat cushion 16 to the ratchet assembly 24. The motion causes the first locking member 28 to be drawn out of the housing defined by the base member 26 and the cover 32. FIGS. 5 and 6 show the first locking member 28 drawn out to different lengths.

The teeth 36 and 46 can be arranged to slide across one another as the first locking member 28 to be drawn out of the housing defined by the base member 26 and the cover 32. FIG. 4 shows the teeth 36 and 46 at a first end limit of meshed engagement and FIG. 5 shows the teeth 36 and 46 at a second end limit of meshed engagement. FIG. 5 thus shows the arrangement of structures when the seat cushion 16 is positioned at the highest orientation relative to the seat frame assembly 12. As will be explained in greater detail below, in the first exemplary embodiment, the seat cushion 16 can be moved higher than the position shown in FIG. 5, but cannot be fixed relative to the seat cushion frame assembly 12 at a position higher than the position shown in FIG. 5.

The sliding movement of the teeth 36 across the teeth 46 allows the pivoting movement of the seat cushion 16 in a first angular direction about the cushion pivoting axis 18. The first angular direction is represented by arrow 52. On the other hand, the configuration of the teeth 36, 46 positively lock the seat cushion 16 and the seat cushion frame assembly 12 relative to each other against pivoting movement in a second angular opposite the first angular direction.

When the user desires to lower the seat cushion 16, the first exemplary embodiment operates such that seat cushion 16 can be first moved fully upward, past the position shown in FIG. 5. During movement past the position shown in FIG. 5, the teeth 36 and 46 can separate. As best shown in FIG. 2, the spring 34 can be connected at a first end to a pin 68 of the second locking member 30 and at a second end to a projection 70 defined by the cover 32. The pin 68 an be integral with the second locking member 30. When the seat cushion 16 is in one of the fixed orientations relative to the seat cushion frame assembly 12, the spring 34 extends below the pivot pin 50 and biases the second locking member 30 such that the teeth 46 are urged to mesh with the teeth 36. During movement past the position shown in FIG. 5, a cam follower portion 72 of the second locking member 30 rides along a cam portion 74 of the first locking member 28 and the second locking member 30 is thus driven in the direction of arrow 48 in FIG. 3. The cam portion 74 is moving because the first locking member 28 is being drawn out of the housing defined by the base member 26 and the cover 30. The cam portion 74 and the cam follower portion 72 thus come into contact as the first and second sets of mating teeth 36, 46 reach the ending of the range of sliding movement.

The force applied by the spring 34 is overcome when the cam follower portion 72 travels up the cam portion 74 and the teeth 36 and 46 can separate. When this occurs, the first end of the spring 34 moves such that the spring 34 then extends above the pivot pin 50, as shown in FIG. 6. This "over-center" effect results in the spring 34 then biasing the teeth 46 further apart from the teeth 36. In FIG. 6, the second locking member 30 is shown in a second position wherein the first and second sets of teeth 36, 46 are spaced from one another.

Figure 7:
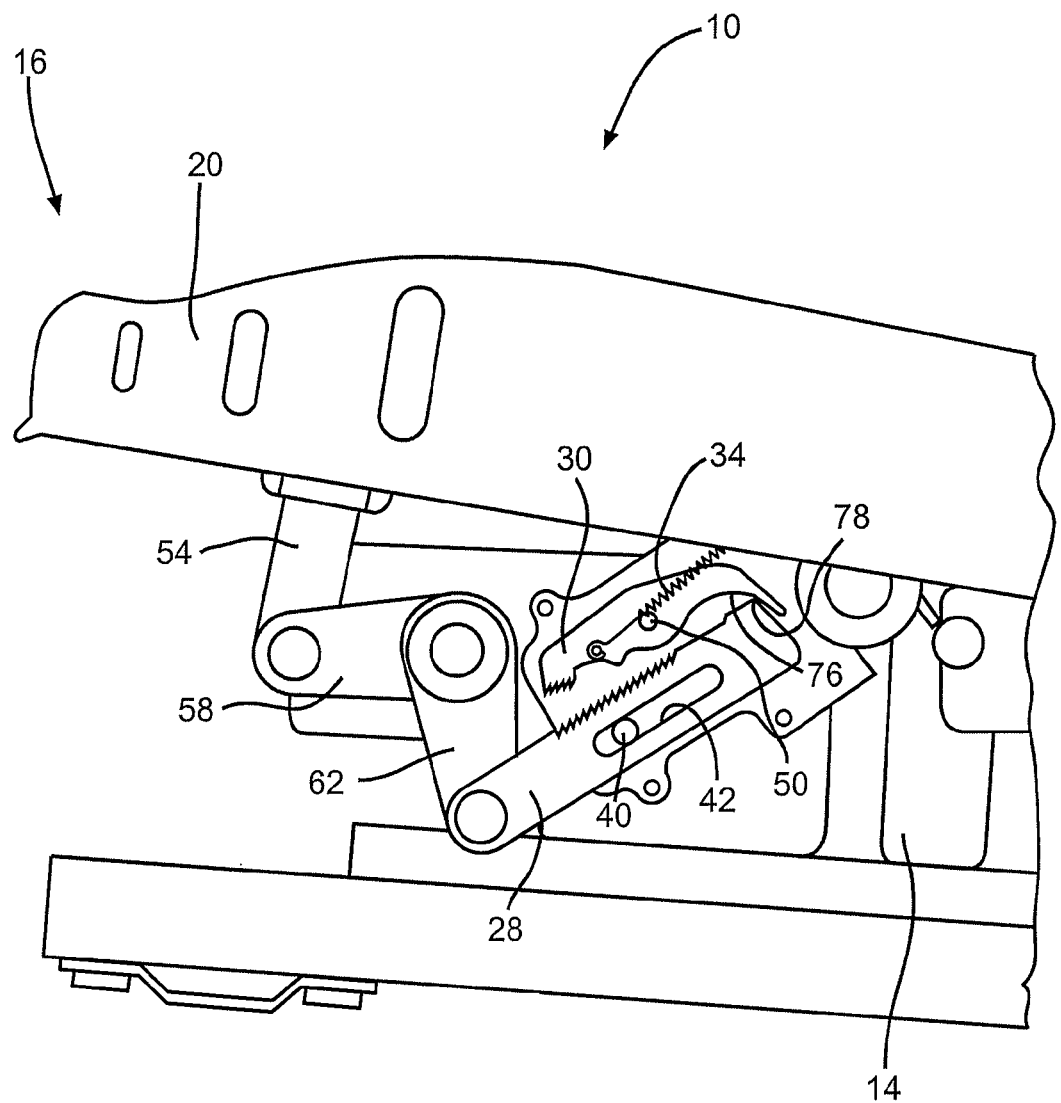
FIG. 7 is a side view similar to FIG. 4 but wherein the seat cushion pan has been lowered from the position shown in FIG. 6 and is shown substantially immediately prior to being returned to the position shown in FIG. 4.

The exemplary spring 34 can be arranged such that it is always elastically deformed, regardless of the position of the second locking member 30. In other words, the spring 34 can always be applying a tensile force urging the pin 68 and projection 70 together. A maximum elastic deformation of the spring 34 can occur when the second locking member 30 is at a third position between the first and second positions. As set forth above, the first position of the exemplary second locking member is shown in FIGS. 3 and 4. The second position of the exemplary second locking member is shown in FIGS. 6 and 7. The third position can be defined when the pin 50 is disposed between the pin 68 and the projection 70. This third position can represent the "center" position of the over-center operation of the spring 34.

In the first exemplary embodiment, when the second locking member 30 is in the second position, the seat cushion 16 is freely moveable. When the seat cushion 16 is returned to the lowest orientation as shown in FIG. 4, the second locking member 30 can move back to the first position in which the teeth 46 again mesh with the teeth 36. During movement back to the position shown in FIG. 4, a cam follower portion 76 of the second locking member 30 rides along a cam portion 78 of the first locking member 28 and the second locking member 30 is thus driven in the direction of arrow 80 in FIG. 3. The force applied by the spring 34 is overcome. When this occurs, the first end of the spring 34 moves such that the spring 34 then extends below the pivot pin 50, as shown in FIG. 4. This "over center" effect results in the spring 34 then biasing the teeth 46 back into engagement with the teeth 36. The first and second sets of mating teeth 36, 46 are thus spaced from one another and the first cam portion 74 is spaced from the first cam follower portion 72 when the second cam portion 78 and the second cam follower portion 76 are in contact with one another.

FIGS. 9-12 show a second embodiment of the invention. A seat 10a includes a seat cushion frame assembly 12a having a first plate member 14a and a second plate member (not shown) that can be a mirror image of the first plate member 14a. The seat 10a also includes a seat cushion 16a mounted on the seat cushion frame assembly 12a for pivoting movement about a cushion pivoting axis 18a. The seat 10a also includes a cushion lock 22a operably disposed to selectively lock the seat cushion frame assembly 12a and the seat cushion 16a relative to one another and thereby prevent the pivoting movement. The cushion lock 22a defines a plurality of locked positions such that the seat cushion 16a is positionable in a plurality of different orientations relative to the seat cushion frame assembly 12a.

The second exemplary cushion lock 22a can include a ratchet assembly. FIGS. 9-12 show a ratchet assembly 24a. The exemplary ratchet assembly 24a can include a first locking member 28a mounted for rotation on a torsion bar 88a. The first locking member 28a is thus directly connected to the torsion bar 88a. The first locking member 28a can be mounted on a side of the plate member 14a that is hidden from view in FIG. 8.

The exemplary ratchet assembly 24a can also include a second locking member 30a and a spring 34a (shown schematically). The first locking member 28a can define a first set of teeth 36a and the second locking member 30a can define a second set of teeth 46a. The second locking member 30a can be mounted on a pin 50a for pivoting movement. The pin 50a can be fixed to a side of the plate member 14a that is hidden from view in FIG. 8.

Figure 8:
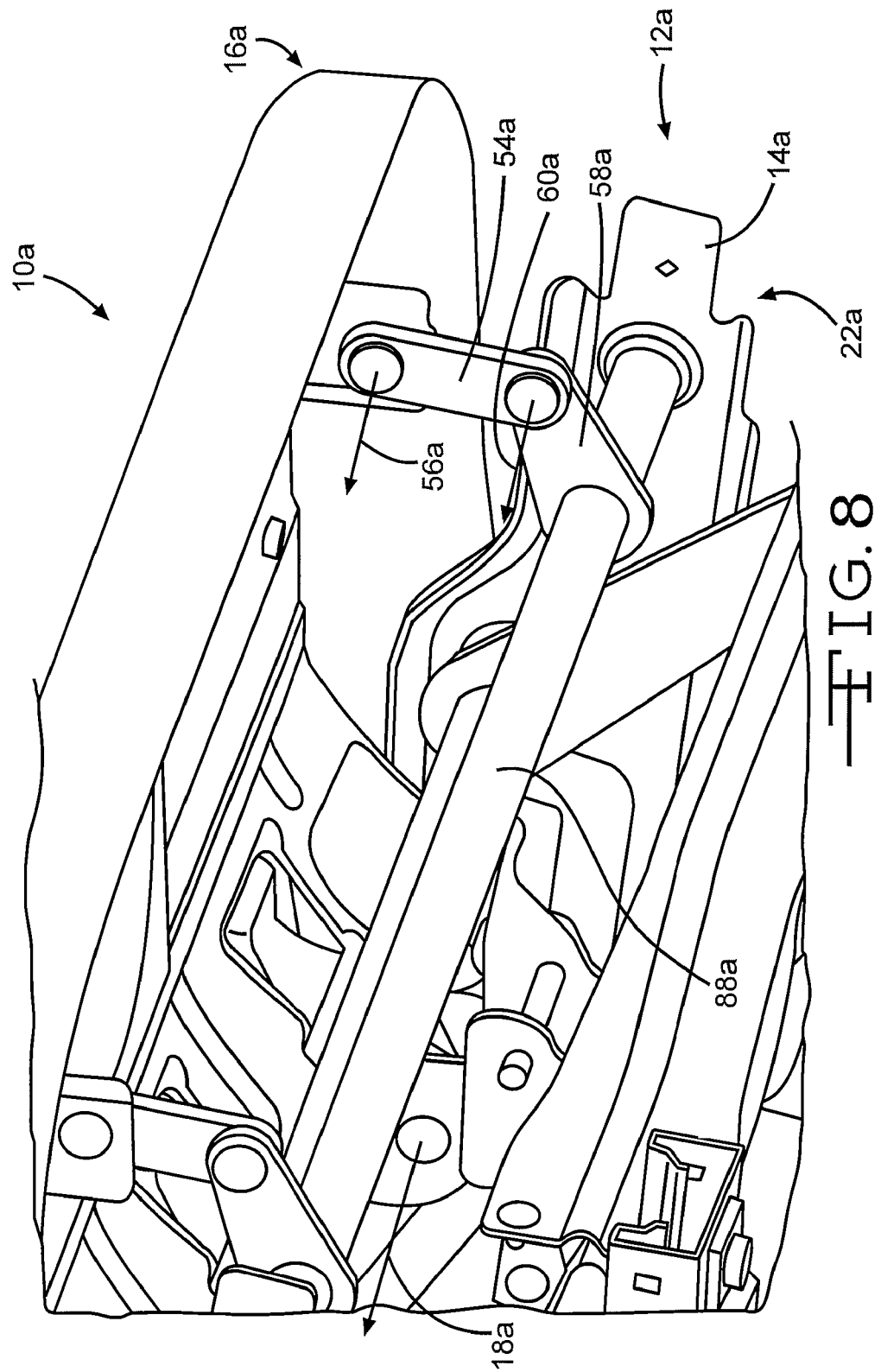
FIG. 8 is a perspective view of a second embodiment of the invention looking into the upper front corner of seat frame wherein the cloth and padding of the seat have been omitted.
Figure 9:
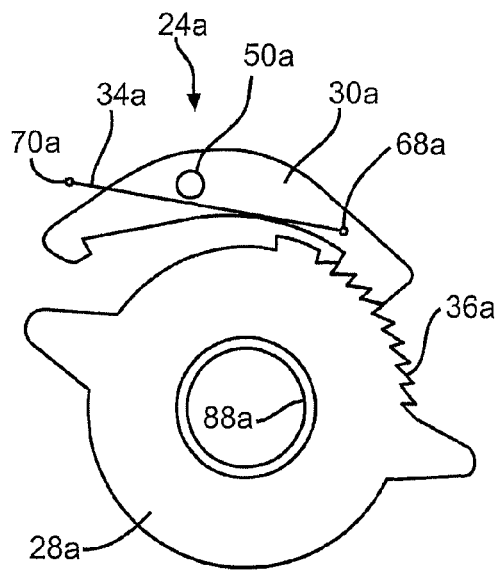
FIG. 9 is a side view of the ratcheting components of a second exemplary ratchet assembly applied in FIG. 8, wherein the exemplary ratcheting components are in positions corresponding to the seat cushion pan being in a lowest sitting position, making FIG. 9 analogous to FIG. 4.

FIG. 9 shows the second locking member 30a in a first position wherein the first and second sets of teeth 36a and 46a are meshed together. FIG. 9 corresponds to the seat cushion 16a being in the lowest orientation relative to the seat cushion frame assembly 12a. A user of the seat desiring to raise the seat cushion 16 about the cushion pivot axis 18a can pull the seat cushion 16 upward. When this occurs, the motion of the seat cushion 16a can be translated to the ratchet assembly 24a. As best seen in FIG. 8, a link 54a can be connected to the seat cushion 16a for pivoting movement about an axis 56a. The link 54a can also be connected to a link 58a for pivoting movement about an axis 60a. The link 58a can also be fixedly associated with the torsion bar 88a.

Figure 10:
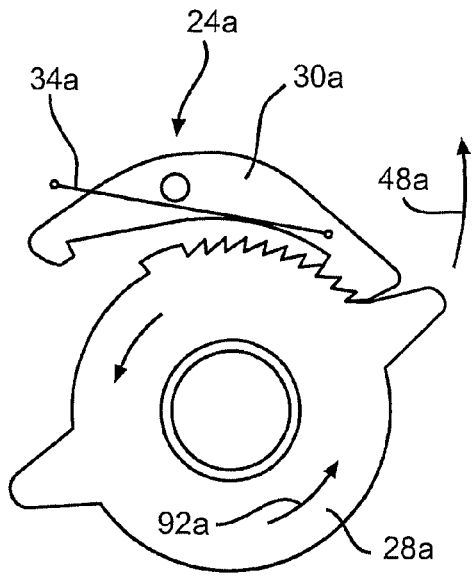
FIG. 10 is a side view similar to FIG. 4 but of the ratcheting components in positions corresponding to the seat cushion pan being in a highest sitting position, making FIG. 10 analogous to FIG. 5.

The relative positions of the first and second locking members 28a and 30a as the exemplary seat cushion 16a is moved from the lowest orientation relative to the seat frame assembly 12a to a high end limit of travel is shown in FIGS. 9-12. As set forth above, FIG. 9 shows the lowest orientation. When the user applies a force to move the seat cushion 16 upwardly, the teeth 36a and 46a can slide across one another as the first locking member 28a rotates relative to the second locking member. FIG. 9 shows the teeth 36a and 46a at a first end limit of meshed engagement and FIG. 10 shows the teeth 36a and 46a at a second end limit of meshed engagement. The first locking member 28a rotates in the direction referenced by arrow 92a between FIGS. 9 and 10. Movement in the direction of arrow 92a corresponds to upward movement of the seat cushion 16a. Movement in the direction of arrow 94a corresponds to downward movement of the seat cushion 16a. FIG. 10 thus shows the relative positions of the first and second locking members 28a, 30a when the seat cushion 16a is positioned at the highest fixed orientation relative to the seat frame assembly 12a.

The sliding movement of the teeth 36a across the teeth 46a allows the pivoting movement of the seat cushion 16a in a first angular direction (upward) about the cushion pivoting axis 18a. On the other hand, the configuration of the teeth 36a, 46a positively lock the seat cushion 16a and the seat cushion frame assembly 12a relative to each other against pivoting movement in a second angular opposite the first angular direction.

Figure 11:
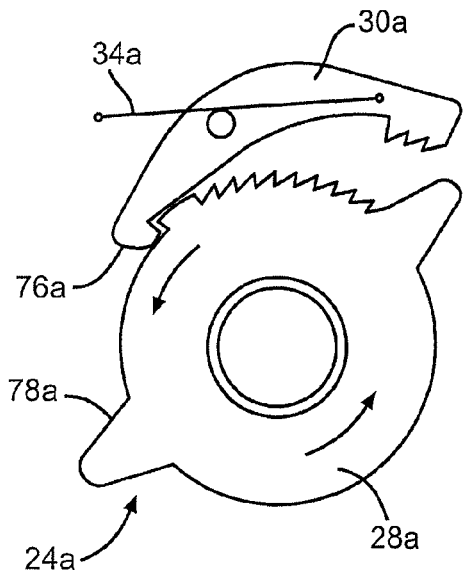
FIG. 11 is a side view similar to FIG. 4 but of the ratcheting components in positions corresponding to the seat cushion pan having been raised past the highest sitting position shown in FIG. 10 in order to release the exemplary ratchet components, making FIG. 11 analogous to FIG. 6.

When the user desires to lower the seat cushion 16a, the second exemplary embodiment operates such that seat cushion 16a can be first moved fully upward, past the position shown in FIG. 10. During movement past the position shown in FIG. 10, the teeth 36a and 46a can separate. The spring 34a can be connected at a first end to a pin 68a of the second locking member 30a and at a second end 70a to the plate member 14a. When the seat cushion 16a is in one of the fixed orientations relative to the seat cushion frame assembly 12a, the spring 34a extends below the pivot pin 50a and biases the second locking member 30a such that the teeth 46a are urged to mesh with the teeth 36a. During movement past the position shown in FIG. 10, a cam follower portion 72a of the second locking member 30a rides along a cam portion 74a of the first locking member 28a and the second locking member 30a is thus driven in the direction of arrow 48a. The force applied by the spring 34a is overcome and the teeth 36a and 46a can separate. When this occurs, the first end of the spring 34a moves such that the spring 34a then extends above the pivot pin 50a, as shown in FIG. 11. This "over center" effect results in the spring 34a then biasing the teeth 46a further apart from the teeth 36a.

The exemplary spring 34a can be arranged such that it is always elastically deformed, regardless of the position of the second locking member 30a. In other words, the spring 34a can always be applying a tensile force urging the pin 68a and second end 70a together. A maximum elastic deformation of the spring 34a can occur when the second locking member 30a moves past the pivot pin 50a.

Figure 12:
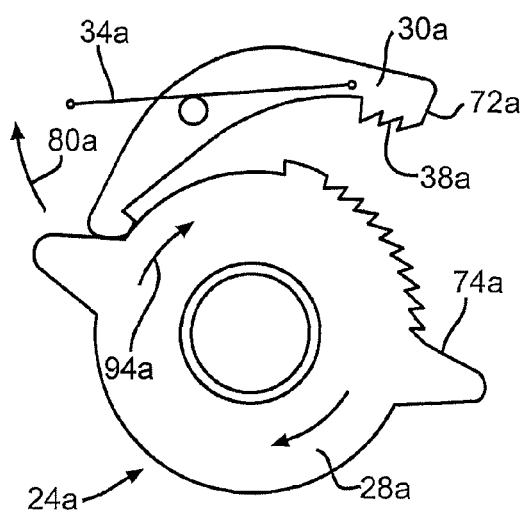
FIG. 12 is a side view similar to FIG. 4 but of the ratcheting components in positions corresponding to the seat cushion pan having been lowered from the position shown in FIG. 11 and substantially immediately prior to the seat cushion pan being returned to the position shown in FIG. 9, making FIG. 12 analogous to FIG. 7.

In the first exemplary embodiment, when the second locking member 30a is in the position shown in FIGS. 11 and 12, the seat cushion 16a is freely moveable. When the seat cushion 16a is returned to the lowest orientation as shown in FIG. 9, the second locking member 30a can move back such that the teeth 46a again mesh with the teeth 36a. During movement back to the position shown in FIG. 9, a cam follower portion 76a of the second locking member 30a rides along a cam portion 78a of the first locking member 28a and the second locking member 30a is thus driven in the direction of arrow 80a. The force applied by the spring 34a is overcome. When this occurs, the first end of the spring 34a moves such that the spring 34a then extends below the pivot pin 50a, as shown in FIG. 9. This "over center" effect results in the spring 34a then biasing the teeth 46a back into engagement with the teeth 36a.

The ratchet assembly 24a can thus lock the torsion bar 88a and prevent the torsion bar 88a from rotating, thereby preventing the seat cushion 16a from pivoting.

Figure 13:
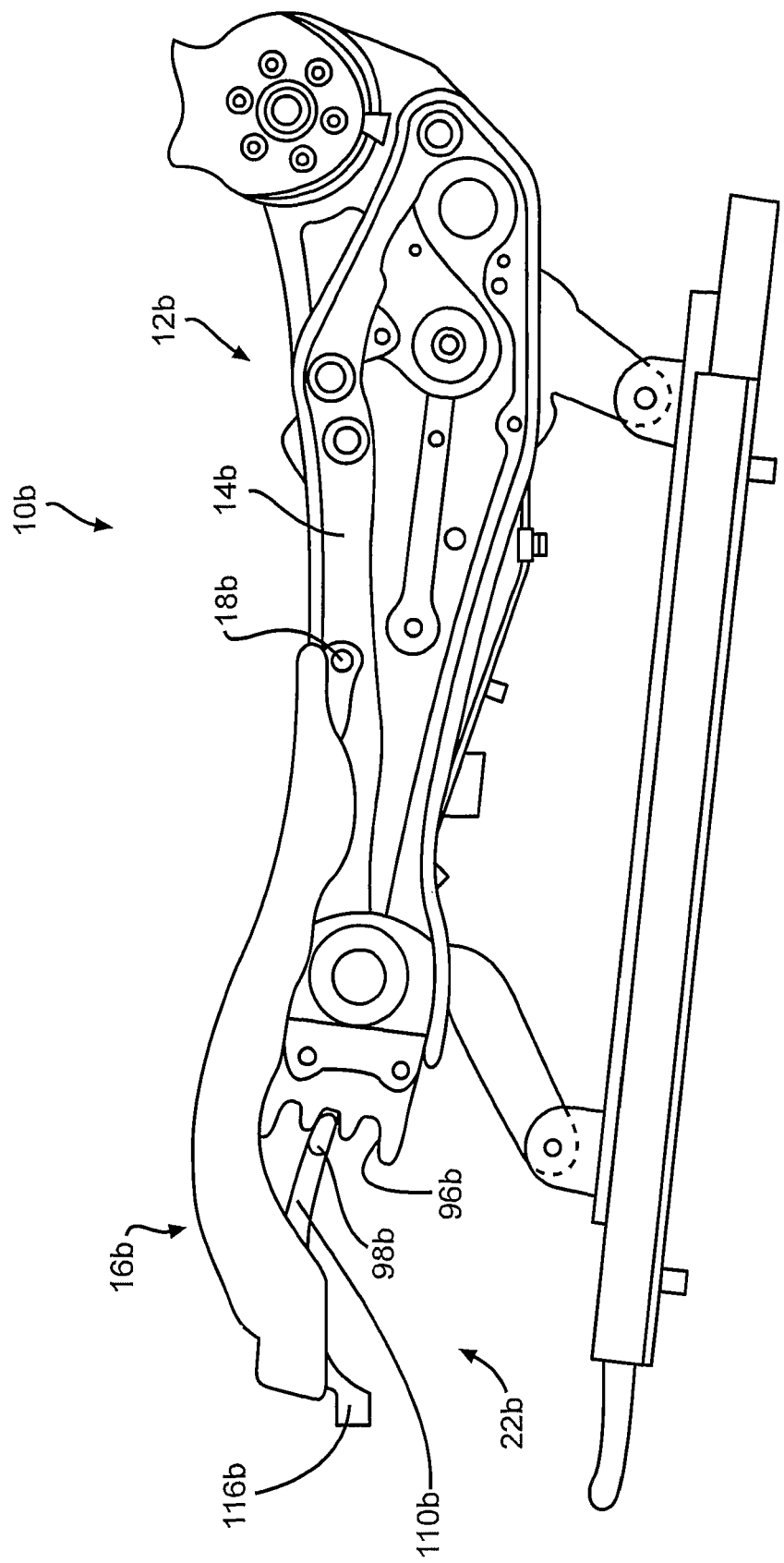
FIG. 13 is a side view of a third embodiment of the invention wherein the cloth and padding of the seat have been omitted.
Figure 14:
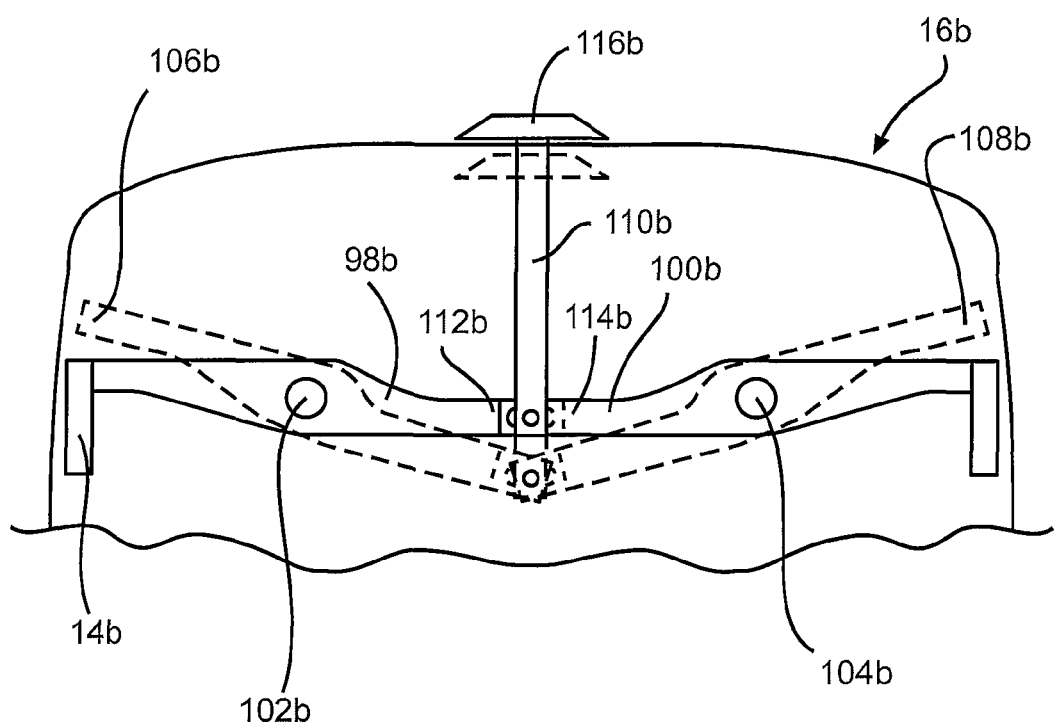
FIG. 14 is a partial bottom view of the third embodiment looking up.

FIGS. 13 and 14 show a third embodiment of the invention. A seat 10b includes a seat cushion frame assembly 12b having a first plate member 14b and a second plate member (not shown) that can be a minor image of the first plate member 14b. The seat 10b also includes a seat cushion 16b mounted on the seat cushion frame assembly 12b for pivoting movement about a cushion pivoting axis 18b. The seat 10b also includes a cushion lock 22b operably disposed to selectively lock the seat cushion frame assembly 12b and the seat cushion 16b relative to one another and thereby prevent the pivoting movement. The cushion lock 22b defines a plurality of locked positions such that the seat cushion 16b is positionable in a plurality of different orientations relative to the seat cushion frame assembly 12b.

The third exemplary cushion lock 22a can include first and second pluralities of slots each fixed with respect to one of the first and second plate members of the seat cushion frame assembly 12b. FIG. 13 shows open slots 96b in the plate member 14b. It is noted that the slots 96b can be formed in the plate member 96b or another plate that is fixed to the plate member 14b. Slots on opposites of the seat cushion 16b can correspond to one of the plurality of different orientations of the seat cushion 16b.

The third exemplary cushion lock 22a can also include first and second locking arms 98b, 100b. The exemplary locking arms 98b, 100b can each be mounted for pivoting movement about respective first and second axes 102b, 104b. The first and second pivoting axes 102b, 104b can be fixed to the seat cushion 16. Each locking arms 98b, 100b can be moved between a first position wherein a distal end 106b of the first locking arm 98b is positioned in one of the first plurality of slots and a distal end 108b of the second locking arm 100b is positioned in one of the second plurality of slots and a second position wherein the distal end 106b of the first locking arm 98b is spaced from all of the first plurality of slots and the distal end 108b of the second locking arm 100b is spaced from all of the second plurality of slots. The first position is shown in solid line in FIG. 14 and the second position is shown in phantom in FIG. 14. The locking arms 98b, 100b can be moved by a lever pivotably fixed to respective second ends 112b, 114b of the locking arms 98b, 100b. The lever 110b can be accessed by a handle 116b. The lever 110b can be positioned between the first and second pluralities of slots.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A seat comprising:
a seat cushion frame assembly;
a seat cushion mounted on said seat cushion frame assembly for pivoting movement about a cushion pivoting axis;
a cushion lock operably disposed to selectively lock said seat cushion frame assembly and said seat cushion relative to one another and thereby prevent the pivoting movement, wherein said cushion lock defines a plurality of locked positions such that said seat cushion is positionable in a plurality of different orientations relative to said seat cushion frame assembly;
a torsion bar engaged with both of said seat cushion frame assembly and said seat cushion; and
a ratchet assembly having a first locking member defining a first set of teeth, and a second locking member defining a second set of teeth, wherein said second locking member is moveable relative to said first locking member between a first position wherein said first and second sets of teeth are meshed together and a second position wherein said first and second sets of teeth are spaced from one another;
wherein said first locking member includes first and second cam portions; and
wherein said second locking member includes a first cam follower portion operable to be driven in movement by said first cam portion and a second cam follower portion operable to be driven in movement by said second cam portion.

2. The seat of claim 1 wherein said torsion bar rotates in response to the pivoting movement of said seat cushion, and said ratchet assembly further comprises:
mating teeth arranged to slide across one another and thereby allow the rotating movement of said torsion bar in a first angular direction about said cushion pivoting axis and to positively lock relative to each other to preclude the rotating movement of said torsion bar in a second angular direction about said cushion pivoting axis opposite the first angular direction.

3. The seat of claim 1 wherein one of said first and second locking members is directly connected to said torsion bar.

4. The seat of claim 3 wherein said ratchet assembly further comprises:
a spring connected at a first end to said second locking member, wherein at least some of the movement of said second locking member between said first and second positions causes said spring to elastically deform.

5. The seat of claim 4 wherein said second locking member and said spring are arranged such that a maximum elastic deformation of said spring occurs when said second locking member is at a third position between said first and second positions.

6. The seat of claim 4 wherein said first and second sets of mating teeth are slidable relative to each another over a range of movement having a beginning and ending and wherein said first and second locking members are arranged such that said first cam portion and said first cam follower portion come into contact as said first and second sets of mating teeth reach said ending of said range of movement.

7. The seat of claim 6 wherein said first and second sets of mating teeth are spaced from one another and said first cam portion is spaced from said first cam follower portion when said second cam portion and said second cam follower portion are in contact with one another.

8. The seat of claim 7 said second locking member is further defined as pivotably moveable and said first locking member is further defined as being movable relative to said second locking member.

9. The seat of claim 8 wherein said ratchet assembly further comprises:
   a base member, wherein said first locking member is mounted on and guided by said base member in sliding movement and said second locking member is mounted on and guided by said base member for pivoting movement.

10. The seat of claim 9 wherein said spring is further defined as connected at said first end to said second locking member and at a second end fixed relative to said base member, wherein a spring axis extending between said first and second ends passes across a pivot axis of said second locking member during movement of said second locking member between said first and second positions.

11. The seat of claim 8 wherein said first locking member of said ratchet assembly is mounted for rotation on said torsion bar.

12. The seat of claim 11 wherein said second locking member of said ratchet assembly is mounted for pivoting movement on said seat frame assembly.

13. The seat of claim 1 wherein said cushion lock further comprises:
   first and second plate members;
   first and second pluralities of slots each fixed with respect to one of said first and second plate members of said seat cushion frame assembly, wherein pairs of slots including one of said first plurality of slots and one of said second plurality of slots correspond to the plurality of different orientations; and
   first and second locking arms each mounted for pivoting movement about respective first and second axes and movable between a first position wherein a distal end of said first locking arm is positioned in one of said first plurality of slots and a distal end of said second locking arm is positioned in one of said second plurality of slots and a second position wherein said distal end of said first locking arm is spaced from all of said first plurality of slots and said distal end of said second locking arm is spaced from all of said second plurality of slots.

14. The seat of claim 13 wherein said first and second pivoting axes are fixed to said seat cushion.

15. The seat of claim 13 wherein said first and second locking arms further comprise respective second ends opposite said respective distal ends and said seat further comprises:
   a lever pivotably fixed to both of said second ends such that movement of said lever is translated to pivoting movement of both of said first and second locking arms.

16. The seat of claim 15 wherein said lever is positioned between said first and second pluralities of slots.

17. The seat of claim 13 wherein all of said first and second pluralities of slots are open at one end.

18. A seat comprising:
   a seat cushion frame assembly;
   a seat cushion mounted on said seat cushion frame assembly for pivoting movement about a cushion pivoting axis; and
   a cushion lock operably disposed to selectively lock said seat cushion frame assembly and said seat cushion relative to one another and thereby prevent the pivoting movement, wherein said cushion lock defines a plurality of locked positions such that said seat cushion is positionable in a plurality of different orientations relative to said seat cushion frame assembly;
   a torsion bar engaged with both of said seat cushion frame assembly and said seat cushion; and
   a ratchet assembly having a first locking member defining a first set of teeth, and a second locking member defining a second set of teeth;
   wherein said second locking member is moveable relative to said first locking member between a first position, wherein said first and second sets of teeth are meshed together, and a second position wherein said first and second sets of teeth are spaced from one another; and
   wherein one of said first and second locking members is directly connected to said torsion bar.

* * * * *